United States Patent
Rovang

(10) Patent No.: US 12,156,509 B2
(45) Date of Patent: Dec. 3, 2024

(54) NO CHOKE, CONTROL HARNESS

(71) Applicant: Daniel Edward Rovang, Fergus Falls, MN (US)

(72) Inventor: Daniel Edward Rovang, Fergus Falls, MN (US)

( * ) Notice: Subject to any disclaimer, the term of this patent is extended or adjusted under 35 U.S.C. 154(b) by 104 days.

(21) Appl. No.: 17/938,339

(22) Filed: Oct. 6, 2022

(65) Prior Publication Data

US 2023/0035255 A1    Feb. 2, 2023

Related U.S. Application Data

(63) Continuation-in-part of application No. 16/781,999, filed on Feb. 4, 2020, now Pat. No. 11,477,966.

(60) Provisional application No. 63/395,329, filed on Aug. 4, 2022, provisional application No. 62/800,571, filed on Feb. 4, 2019.

(51) Int. Cl.
*A01K 27/00* (2006.01)

(52) U.S. Cl.
CPC .......... *A01K 27/002* (2013.01); *A01K 27/005* (2013.01)

(58) Field of Classification Search
CPC .... A01K 27/002; A01K 27/00; A01K 27/005; A01K 27/003
See application file for complete search history.

(56) References Cited

U.S. PATENT DOCUMENTS

| | | | |
|---|---|---|---|
| 4,969,419 A * | 11/1990 | Fong | A01K 23/00 119/868 |
| 5,145,027 A * | 9/1992 | Petzl | A62B 35/0025 119/770 |
| 5,713,308 A | 2/1998 | Holt, Jr. | |
| 6,039,677 A * | 3/2000 | Spletzer | A63B 21/0605 2/22 |
| 6,792,894 B1 | 9/2004 | Donaldson | |
| 6,837,187 B2 * | 1/2005 | Berardo | A01K 23/00 119/792 |
| 7,284,504 B1 * | 10/2007 | Purschwitz, Jr. | A01K 1/0263 119/792 |
| 8,869,751 B2 * | 10/2014 | Ben Yosef | A01K 27/002 119/856 |
| 10,194,641 B1 | 2/2019 | Benabud | |
| 10,238,091 B2 * | 3/2019 | Hoffman | A01K 15/027 |
| 2008/0177210 A1 * | 7/2008 | McDevitt Larson | A01K 27/002 602/23 |
| 2013/0029813 A1 | 1/2013 | Hetrick et al. | |

(Continued)

*Primary Examiner* — Kristen C Hayes
(74) *Attorney, Agent, or Firm* — Mitchell Hamline IP Clinic

(57) ABSTRACT

A no choke, control harness may include a main harness strap comprising a first end, a second end opposite the first end, and a midpoint. The main harness strap may define a lateral orientation and may be configured for draping across the withers of a quadruped. The harness may also include a first and second leg loops extending respective ends of the main harness strap in respective first and second lateral direction. The leg loops may be configured for positioning around respective forelegs of the quadruped. Each leg loop may be formed from a strap having a first end and a second end opposite the first end sharing a top surface and a bottom surface wherein the top surface of the first end is connected to the bottom surface of the second end. The harness may also include a leash attachment.

20 Claims, 13 Drawing Sheets

(56) References Cited

U.S. PATENT DOCUMENTS

2013/0263795 A1\* 10/2013 Ben Yosef ........... A01K 27/002
119/856

\* cited by examiner

NO CHOKE, CONTROL HARNESS

CROSS-REFERENCE TO RELATED APPLICATIONS

The present application claims priority to U.S. Non-Provisional patent application Ser. No. 16/781,999 filed on Feb. 4, 2020 and entitled No Choke, Control Harness, which application claims priority to U.S. provisional patent application Ser. No. 62/800,571 filed on Feb. 4, 2019 and entitled No Choke, Control Harness. The present application further claims priority to U.S. provisional patent application Ser. No. 63/395,329 filed on Aug. 4, 2022 and entitled No Choke, Control Harness. The content of each of these applications is hereby incorporated by reference herein in its entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The following is a tabulation of documents that appear to be potentially relevant at the time of filing:

| Patent Number | Kind Code | Issue Date | Patentee |
| --- | --- | --- | --- |
| 10,194,641 | B1 | 2019 Feb. 5 | Benabud |
| 8,869,751 | B2 | 2014 Oct. 28 | Ben Yosef et al. |
| 6,792,894 | B1 | 2004 Sep. 21 | Donaldson |
| 5,713,308 | — | 1998 Feb. 3 | Holt, Jr. |

Domesticated quadrupeds, such as dogs and cats, for example, are often controlled using a restraining or leading device, especially when outdoors. Such a device aids in the quadruped's safety by allowing an owner or walker to keep them from a variety of harmful circumstances including, for example, chasing cars, pursuing wild animals and other domestic quadrupeds, or running away from their owner and becoming lost.

Many devices are offered for leading or restraining a quadruped and can generically be referred to as collars, harnesses, halters, or other devices for securing to the quadruped and securing to a leash. Many of these known devices may be appropriate and adequate for a quadruped with a mild and/or docile temperament. However, a high-energy, spirited, aggressive, or rambunctious quadruped, that is given to strong pulling and jumping against a conventional harness or collar, will most likely encounter a serious safety problem with the current collar, harness, and halter offerings. For example, many of these devices encircle the throat, neck, trachea and/or esophagus region. A quadruped that pulls or jumps against a conventional harness or collar may risk choking and self-injury. Potential problems include muscular and vascular injury, crushing damage to bone and cartilage, and airway and vascular restriction. Oftentimes, injury or irritation caused by a restraining device is evidenced by a prolonged coughing episode, even after the pulling episode is over and the device has been removed.

SUMMARY

In one or more examples, a no choke, control harness, may include a main harness strap including a first end, a second end opposite the first end, and a midpoint. The main harness strap may define a lateral orientation and be configured for draping across the withers of a quadruped. The harness may also include a first leg loop extending from the first end of the main harness strap in a first lateral direction and configured for positioning around a first foreleg of the quadruped. The first leg loop may be formed from a strap having a first end and a second end opposite the first end sharing a top surface and a bottom surface wherein the top surface of the first end is connected to the bottom surface of the second end. The harness may also include a second leg loop extending from the second end of the main harness strap in a second lateral direction opposite the first lateral direction and configured for positioning around a second foreleg of the quadruped. The second leg loop may be formed from a strap having a first end and a second end opposite the first end sharing a top surface and a bottom surface wherein the top surface of the first end is connected to the bottom surface of the second end. The harness may also include a leash attachment coupled to the control harness.

In one or more examples, a no choke, control harness may include a main harness strap including a first end, a second end opposite the first end, and a midpoint. The main harness strap may define a lateral orientation and may be configured for draping across the withers of a quadruped. The harness may also include a first leg loop extending from the first end of the main harness strap in a first lateral direction and configured for positioning around a first foreleg of the quadruped. The harness may also include a second leg loop extending from the second end of the main harness strap in a second lateral direction opposite the first lateral direction and configured for positioning around a second foreleg of the quadruped. The harness may also include a leash attachment coupled to the control harness and a body loop strap configured to encircle the girth of the quadruped's body in the ribcage area.

In one or more examples, a method of placing a no choke, control harness on a quadruped may involve a harness including a main harness strap with a first end and a second end, a first leg loop extending from the first end of the main harness strap, and a second leg loop extending from the second end of the main harness strap. The method may include draping the main harness strap across the withers of the quadruped, placing the first leg loop around the first foreleg of the quadruped, placing the second leg loop around the second foreleg of the quadruped, and avoiding placement of any restraining component across the chest or neck area of the quadruped.

Figure 1:
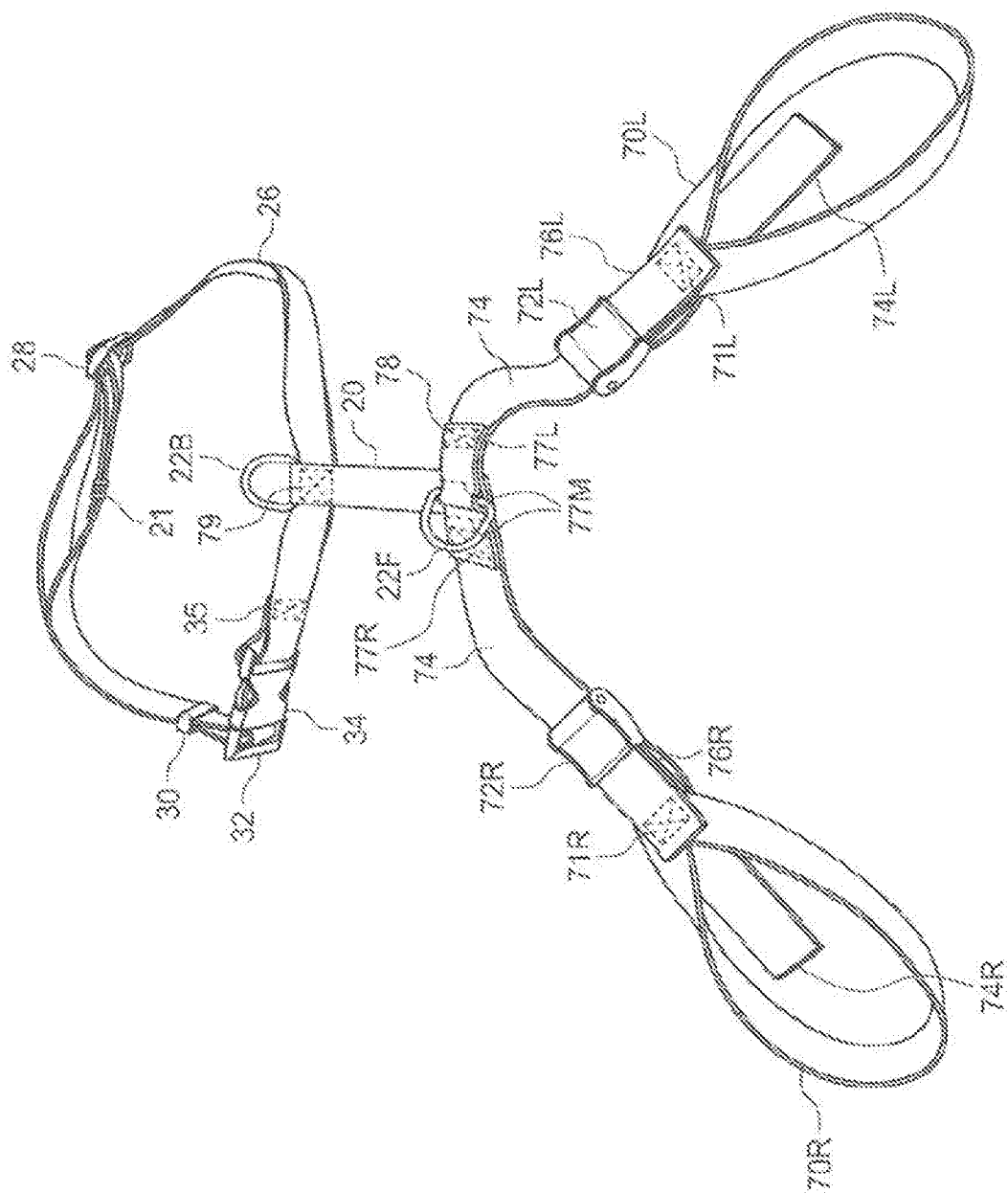
FIG. 1 shows a perspective view of an example of a no choke, control harness showing features in detail.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Prior to explaining the examples of a "no choke, control harness" in detail, it is to be understood that this disclosure is not meant to be limited to the details of construction or arrangements of the components and method steps set forth in the following description or illustrated in the drawings. Examples of this disclosure are capable of other examples and of being practiced and carried out in various ways. Also, it is to be understood that the phraseology and terminology employed herein are for the purpose of the description and should not be regarded as limiting.

For ease of understanding and clear orientation of spatial direction in the description of the below listed harness examples and elements thereof, the use of the directions such as "right", "left", "up", "down", "forward", "back", "under", "beneath", "below", "over", "above", "front" and "rear" shall be consistent with the conventional human understanding of these directions and are referenced as orientated to the perspective of a quadruped wearing the no choke, control harness. For example, the direction left would correlate to the left side of the quadruped. A right leg loop, for example, would be placed on the right leg of the quadruped.

For ease of understanding and clear orientation of spatial direction in the description, the below listed no choke, control harness examples and elements thereof are described using directions in relation to three different planes of the quadruped: (1) a sagittal plane, (2) a frontal plane, and (3) a transverse plane. The sagittal plane is oriented vertically and extends horizontally along a backbone of the quadruped to divide the quadruped into a right half and a left half. The frontal plane is oriented horizontally and extends horizontally through a vertical midpoint of the quadruped to divide the quadruped into a dorsal half and a ventral half. The transverse plane is oriented vertically and extends laterally through the quadruped to divide the quadruped into a superior or frontal half and an inferior or rear half.

Additionally, directional terms that refer to each plane are defined. "Superior" and "inferior" refer to either side of the transverse plane, where the superior side is closer to the quadruped's head and the inferior side closer to the quadruped's rear. "Ventral" and "dorsal" refer to either side of the frontal plane, where the ventral side represents the half that is closer to the ground (such as the legs and belly) and the dorsal side represents the half that is furthest from the ground (such as the head and backbone). "Medial" and "lateral" refer to the distance of a point from the sagittal plane along the transverse plane, where medial points are generally closer to the center of the quadruped's body within a cross section, and lateral points are further from the center of the quadruped's body within a cross section toward an outer layer of skin.

For ease of explanation, the phrase "no choke, control harness" shall be considered to be equivalent and interchangeable with the word "harness" throughout the Detailed Description. The phrase "means of fastening" includes any device or method of "joining," "conjoining," and "connecting" including such means as sewing, gluing, taping or otherwise fastening.

Figure 2:
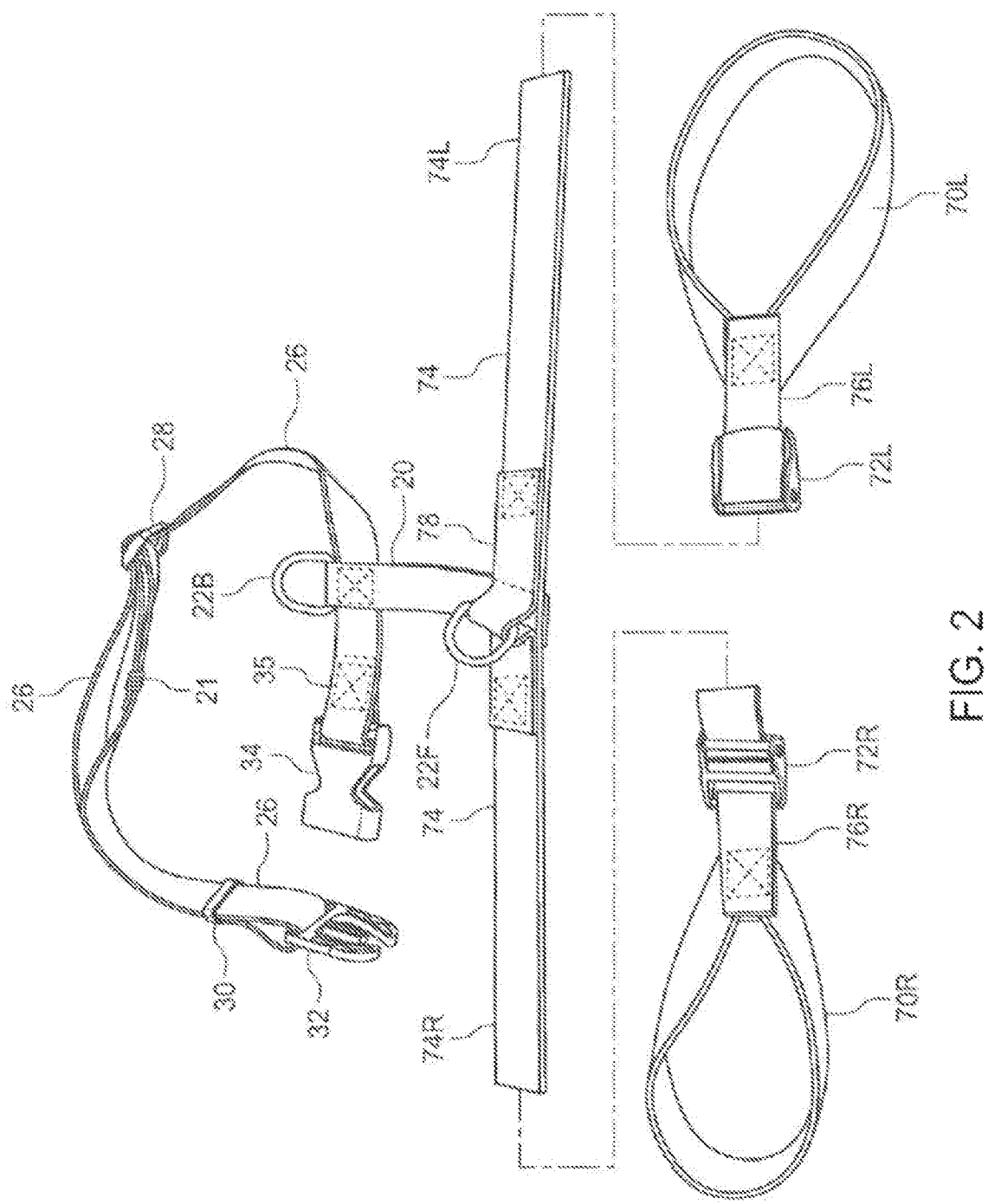
FIG. 2 shows a bird's eye perspective view of the example no choke, control harness of FIG. 1 with the leg loops removed from the main body of the harness, demonstrating how the leg loops are slidably received to the harness with one of the cam buckles displayed in the open, unlocked, position and a rear body loop in an unbuckled state.

Now referencing FIGS. 1 and 2 which illustrate the first example of the "no choke, control harness" hereinafter referenced to as "harness". The harness shown may include a main harness strap 74 including a first end 74R, a second end 74L, and a midpoint 78.

The first end 74R interacts with a first leg loop 70R which is formed by a strap of sufficient length to, when folded into a loop, create a large enough loop to encircle the quadruped's leg, having two ends placed with one end overlapping the other at an acute angle and held together for sewing between the two ends of right leg loop connector strap 76R. The right leg loop connector strap 76R is inserted into the slidable right leg loop cam buckle 72R. Upon inserting loop connector strap 76R into cam buckle 72R, strap 76R is wrapped around the strap connection bar component of cam buckle 72R. Strap 76R, while still engaged and wrapped around the strap connection bar of cam buckle 72R is then folded back upon itself positioning each end evenly with the other, each end equally distant from the strap connection bar component of cam buckle 72R. The ends of leg loop 70R, which are held together, are placed between the ends of strap 76R, which are held together with each end the same distance from cam buckle 72R and sewn together forming the seam 71R. The orientation of loop 70R and strap 76R is such that the ends of loop 70R are directed towards cam buckle 72R. The unity of right leg loop 70R, right leg loop connector strap 76R and slidable right leg loop cam buckle 72R creates a unit or leg loop assembly that can be slidably received by the right main harness end 74R. The cam buckle 72R can be locked and released to allow the leg loop assembly to move between end 74R and the midpoint of the main harness strap 74.

Now looking to the left leg loop and assembly thereof: The harness shown includes a left leg loop 70L which is formed by a strap of sufficient length to, when folded into a loop, create a large enough loop to encircle the quadruped's leg, having two ends placed with one end overlapping the other at an acute angle to be held together for sewing between the two ends of left leg loop connector strap 76L. The left leg loop connector strap 76L is inserted into the slidable left leg loop cam buckle 72L. Upon inserting loop connector strap 76L into cam buckle 72L, strap 76L is wrapped around the strap connection bar component of cam buckle 72L. Strap 76L, while still engaged and wrapped around the strap connection bar of cam buckle 72L is then folded back upon itself positioning each end evenly with the other with respect to the connection bar component of cam buckle 72L. The ends of leg loop 70L, which are held together, are placed between the ends of strap 76L, which are held together with each end the same distance from the connecter bar of cam buckle of 72L and sewn together forming the seam 71L. The orientation of loop 70L and strap 76L such that the point formed by the overlapping ends of loop 70L are directed towards cam buckle 72L. The unity of left leg loop 70L, left leg loop connector strap 76L and slidable left leg loop cam buckle 72L creates a unit or leg loop assembly that can be slidably received by the left main harness end 74L. The cam buckle 72L can be locked and released to allow the leg loop assembly to move between end 74L and the midpoint of the main harness strap 74. Because the left and right leg loops and assembly of associated components follow the same steps of assembly and use the same elements, the assembled components will look very similar and could be used interchangeably in actual use. In addition, in one or more examples, the acute angle may instead be a right angle or an obtuse angle. Still other orientations and geometries of the angle may be provided.

The main harness strap 74 serves to connect the right leg loop 70R, the left leg loop 70L as well as being the connection point for the body loop strap 26. The front leash loop strap 78 can be positioned at the center point of and parallel to the length of main strap 74. A front leash loop 22F is placed centered between strap 78 and strap 74. Right seam 77R and left seam 77L are sewn at the respective ends of strap 78, securing it to strap 74. Leash loop 22F is held in place by this attachment. A mid piece strap 20 is positioned at an angle to strap 74 and placed generally on the center point of the strap 74 on the side opposite of strap 78. Seam 77M is made securing strap 20 to strap 74 and further securing strap 78 and leash loop 22F with this additional seaming. A body loop strap 26 is introduced. The remaining unattached end of mid piece strap 20 is placed at an angle on the top side of body loop strap 26. A rear leash loop 22B is placed between the end of strap 20 where it intersects with body loop 26. The end of strap 20 is folded back underneath strap 26 forming a three-ply joint thereby holding leash loop 22B in place and is securely fastened by seam 79. On the end of body loop 26 that now extends towards the right-side orientation of the harness the female end of a two-piece releasable buckle 34, is attached by folding the end of strap 26 through the strap connector bar on buckle piece 34 and securing the folded end with seam 35. The remaining end of strap 26 is passed through tri-glide buckle 28, through strap keeper 30, and through the strap connector bar on the male end of the two-piece buckle 32. After passing through the strap connector bar on buckle 32, the end of strap 26 doubles back upon itself. While remaining doubled, strap 26 passes back through keeper 30 and returns to tri-glide buckle 28. Buckle 28 is now connected to the end of body loop strap 26 by inserting one end of 26 through the center strap connector bar of buckle 28 and folding the end back upon itself and securing the end with seam 21. This completes the description showing how to construct the no choke, control harness shown in FIGS. 1 and 2. FIG. 2 shows a view of this example of the no choke, control harness with the right leg loop assembly comprised of 70R, 76R and 72R and the left leg loop assembly comprised of 70L, 76L and 72L separated from the main body of the harness, demonstrating how the leg loops are slidably received to the harness with cam buckle 72R displayed in the open, unlocked, position and the rear body loop 26 in an unbuckled state.

The application and use of the no choke, control harness in this first example is accomplished by positioning the quadruped in a standing position. The harness should be in an assembled state, meaning that the leg loops 70R and 70L are in proper connection to the main harness strap 74 with cam buckles 72R and 72L in the locked position engaging the main harness strap ends 74R and 74L respectively. For the proper initial placement on the quadruped, the left leg loop 70L should be orientated to the left side of the quadruped and the right leg loop 70R should be orientated to the right side of the quadruped. The body loop strap 26 should be towards the rear, or inferior end, of the quadruped in relation to the leg loops. To further ensure that the harness is properly oriented, determine by observation that front leash loop 22F is on the side of harness strap 74 which is facing away from the quadruped's body and that loop 22F is in an upward position ready to easily receive attachment to a leash from above. Another indicator of proper orientation would be to verify that rear leash loop 22B is placed towards the rear of the quadruped.

With the handler facing the quadruped, the quadruped still standing, and the correct orientation of the harness determined, the harness is placed over the top of the quadruped on the dorsal region of the animal, much in the way that a saddle would be placed on a horse. When placed on the dorsal region properly, the front leash loop 22F will sit directly over the area of the quadruped's withers. The withers are the area where the neck intersects with the forward top of the quadruped's back. Or, about where the saddle horn would be positioned on a horse with a western style saddle. Now, having the harness in position with the leg loops 70R and 70L hanging to the sides of the quadruped, grasp loop 70L turning the loop in towards the quadruped and upwards. Gently lift the quadruped's left foreleg and place it through the aperture of loop 70L. Once the foreleg has passed through loop 70L, continue to slide 70L upwards on the left leg to a loose position above the elbow with the fitment slightly loose from the left leg pit. Having secured the left loop 70L in the proper position, now attend to the right leg loop 70R. Ensure that the main harness strap 74 is still in alignment over the quadruped's back with front leash loop 22F still in proper alignment over the withers. Once again, this time working from the right side of the quadruped and still facing the quadruped, gently lift the quadruped's right foreleg and place it through the aperture of loop 70R. Once the right foreleg has passed through loop 70R, continue to slide 70R upwards on the right leg to a position above the elbow with the fitment loose from the right leg pit. If, upon checking, the fitment of either leg loop is too loose or too tight compared to desired fit, open the latch mechanism on the cam buckle on the side that needs adjustment. This will be either cam buckle 72R or 72L. With the appropriate cam buckle unlocked, adjustment is easily made by sliding the cam buckle up or down the length of either end of main harness strap 74. This sliding effectively moves the leg loop up or down, or tighter or looser on the leg. If the harness is to be placed on a quadruped with limited range of motion, very long legs, or other condition that may prevent the foreleg from being lifted high enough or bending adequately without discomfort or overextension, the slidable feature of the leg loop allows it to be moved to the very end of strap 74. In addition, the leg loop can be detached from strap 74 completely, placed properly over the leg without bending, slid up the leg to the proper leg pit position and slidably reattached by reinserting the appropriate end of strap 74, being either main harness strap end 74R or 74L. With both leg loops in proper placement and adjustment, attention is now turned to body loop strap 26. Encircle the girth of the quadruped in the ribcage area and clasp together the two parts of the releasable buckle 32 and 34, forming a closed loop securing the harness on the quadruped. If the body loop strap is too loose or too tight compared to desired fit, fitment adjustment can be made through use of the slidable adjustment of tri-glide buckle 28. With the harness now placed on the quadruped, correctly adjusted and secured, a leash may be connected to either leash loop 22F or 22R.

Figure 3:
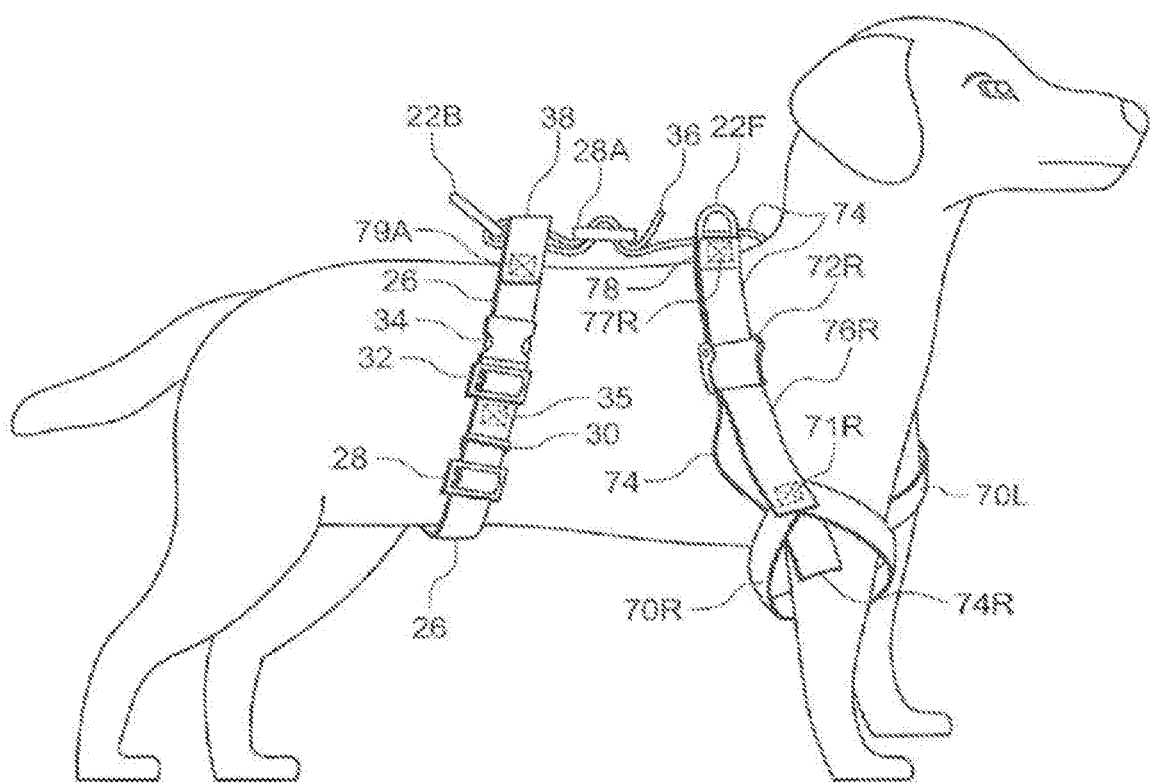
FIG. 3 shows a perspective side view of the no choke, control harness of FIG. 1 on a quadruped's body showing the length adjustable back strap, the placement of the body loop and leg loops in relation to the animal's body, and the slidably feature of the leg loops.
Figure 7:
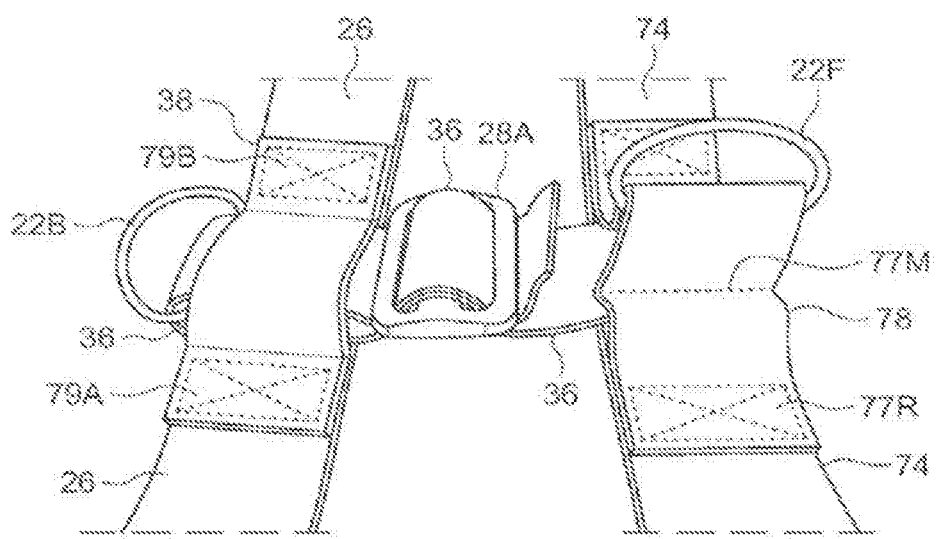
FIG. 7 shows a perspective dose-up partial view of the no choke, control harness of FIG. 1 demonstrating the front and rear leash attachment rings, the length adjustable mid strap and the short keeper strap piece that overlays the rear body loop strap keeping the mid-strap in place.

FIGS. 3 and 7 show another example of the harness whereby a length adjustable, mid piece strap 36 is a replacement for mid piece strap 20 shown the first example, Strap 36 is accompanied by a short keeper strap piece 38. One end of strap 36 is fastened at an angle to the center point of the main harness strap 74 at seam 77M. The other end of strap 36 approaches body loop strap 26 at an angle, crossing under body loop strap 26. The end of strap 36 then doubles back on itself wrapping back over the top side of strap 26 with the unfastened end of strap 36 threading through tri-glide buckle 28A, completing a slidable adjustable strap assembly. Keeper strap 38 is placed on strap 36 and parallel to strap 26. Strap 38 can be sewn in place at seam 79A and 79B. Strap 36 slides loosely under strap 38 allowing movement for strap length changes in strap 36, Rear leash loop 22B is also held in place by the loop formed by strap 36 as it wraps around body loop strap 26, Adjustment of the strap length at tri-glide 28 allows for adjusting the position of body loop 25. This adjustability is useful and desirable for accommodating the differing body lengths of quadrupeds.

Figure 6:
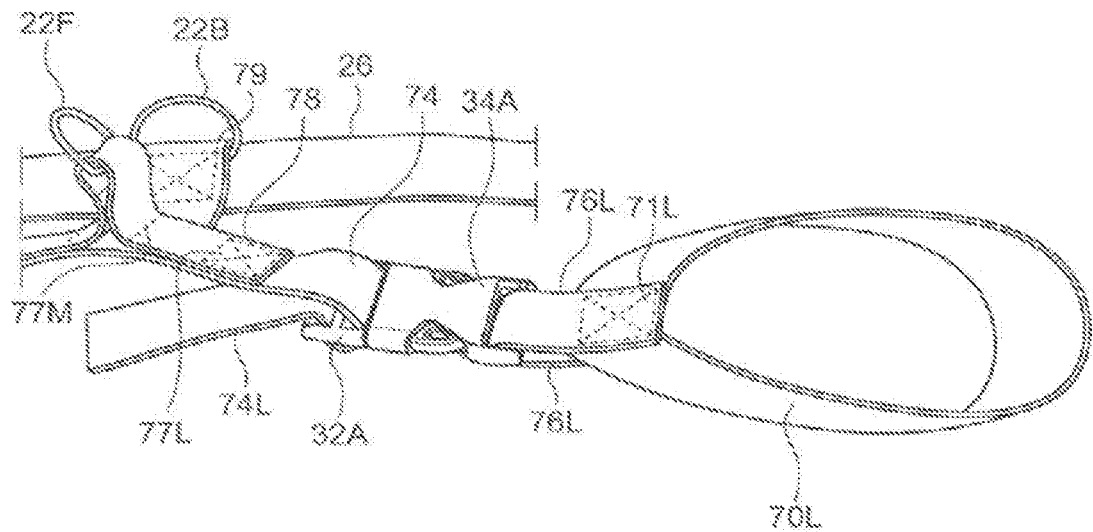
FIG. 6 shows a perspective close-up partial view of one example of a leg loop attached to a harness with a slidably releasable buckle instead of a cam buckle and showing how it is slidably received by the front harness that connects both front leg loops.
Figure 8:
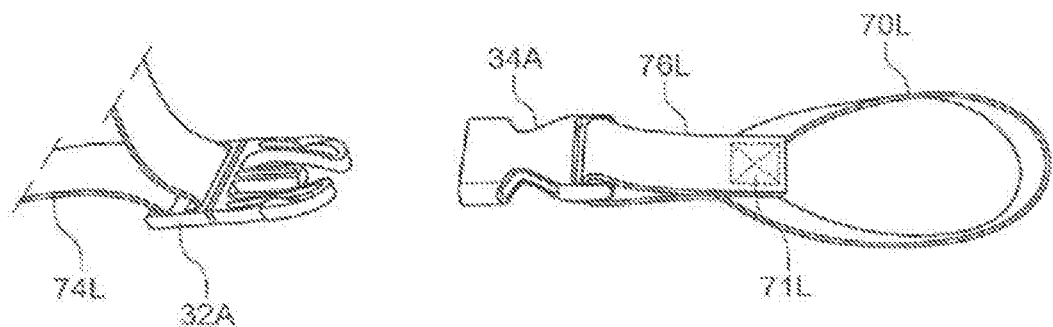
FIG. 8 shows a perspective close-up partial view of the leg loops of FIG. 6 in the released position.

FIGS. 6 and 8 disclose another example of the harness showing a slidable two-piece releasable buckle with female end buckle 34A and a male end buckle 32A replacing cam buckle 72L. This disclosure would be used in the assembly of the left and right leg loops, although only the left leg loop 70L is disclosed in the illustrations in FIGS. 6 and 8 for the purpose of example. In referencing use on the right side of the harness the right leg loop assembly 34A and 32A would replace cam buckle 72R, The quick release buckle works more conveniently than other release methods, if it is frequently necessary to remove the leg loop to more easily place it on a quadruped that may have limited flexibility or other limitations. In contrast, the cam buckle feature is more convenient for leg loop length adjustment in comparison to other release methods.

Figure 9:
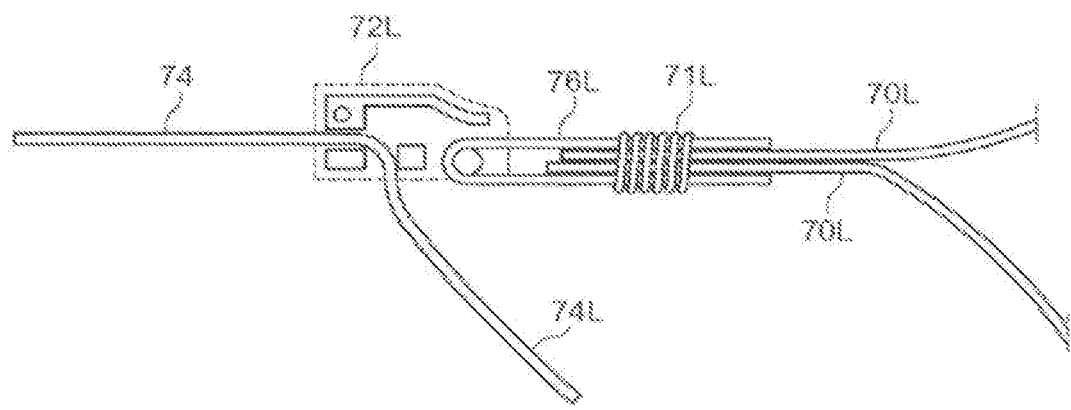
FIG. 9 shows a side cutaway close-up view of the slidable cam buckle of the harness of FIG. 1 where one end of the main front harness strap is inserted through cam buckle passage, shown in the locked position, with a partial view of the angularly joined ends of one leg loop connected to the doubled over end portions of a strap that adjoins the cam buckle and the leg loop by threading through the holding bar on the cam buckle.

FIG. 9 shows a side cutaway close-up partial view of an example of the no choke, control harness demonstrating how main harness strap end 74L of the main harness strap 74, is inserted through the slidable cam buckle passage 72L. Cam buckle 72L is shown in the locked position with a partial view of the angularly joined ends of one leg loop 70L connected to a doubled over end portion of the strap 76L that conjoins the cam buckle 72L and the leg loop 70L by threading through the holding bar on the cam buckle and concluding with a sewn seam at 71L. Though not illustrated in FIG. 9, the right-side cam buckle 72R and affiliated right loop components interact in an identical manner.

Figure 5:
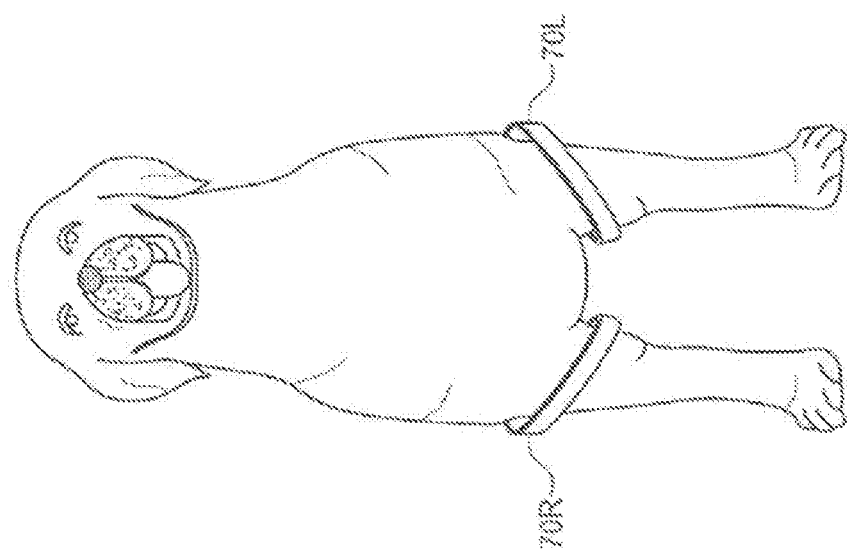
FIG. 5 shows a frontal perspective view of the no choke, control harness, of FIG. 1 clearly demonstrating that there are no harness components that cross the chest, neck, throat or point of chest areas on the frontal area of the quadruped.
Figure 4:
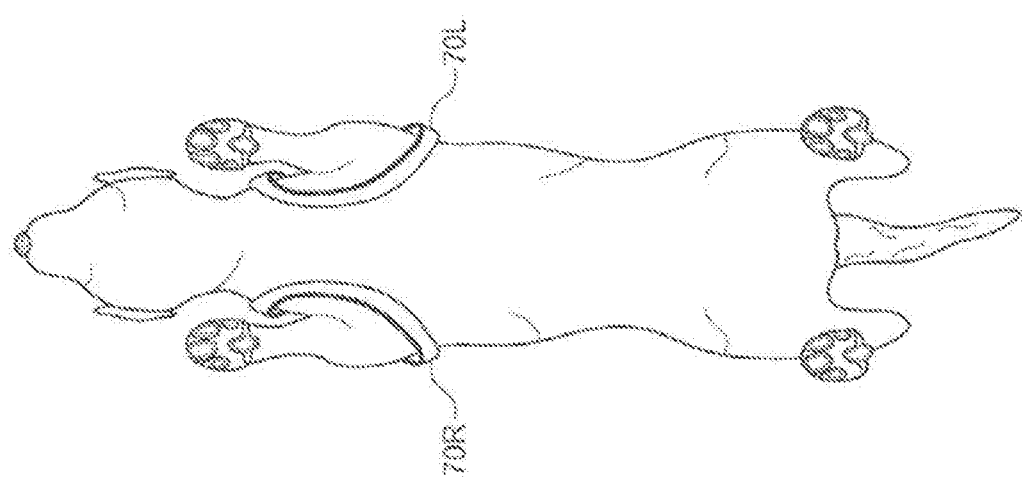
FIG. 4 shows a perspective view of the no choke, control harness of FIG. 1 visualized from beneath a quadruped, demonstrating the placement of the leg loops in a proper, relaxed, and unconstricting manner with no body loop present.

FIG. 4 discloses a view from underneath the quadruped. FIG. 5 discloses a view of the front of the quadruped. These views illustrate how leg loops 70R and 70L do not cross the neck or chest area of the quadruped the way other collars, harnesses, and halters do. Because no component of the harness crosses the neck or chest of the quadruped, the potential for choking or injury is minimized.

Figure 10:
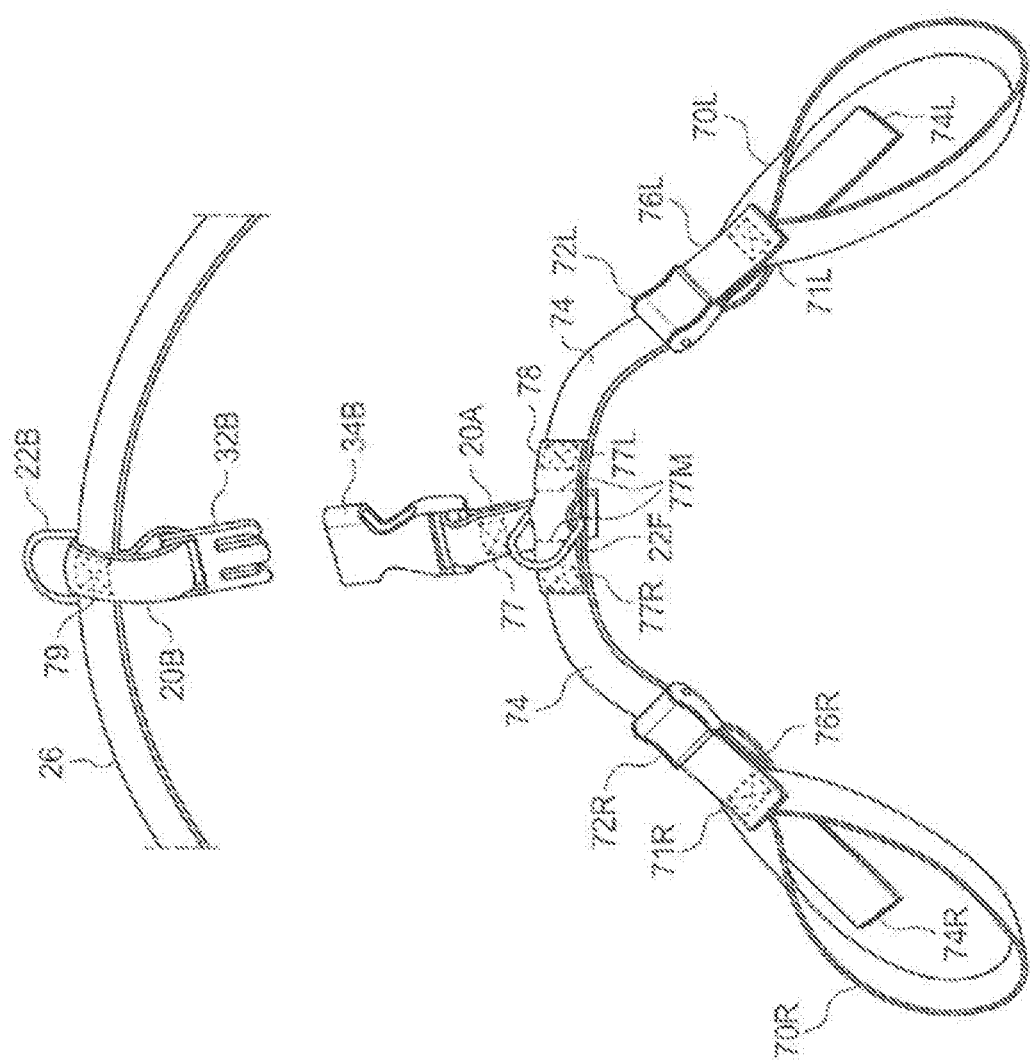
FIG. 10 shows a perspective partial view of another example of a no choke, control harness having a releasable center strap that adjoins the front leg loop connecting strap and the rear body loop strap allowing for the front leg loop portion of the harness to be worn separately.

FIG. 10 shares another example of the harness with a modification to the mid strap connection between main harness strap 74 and body loop strap 26. Strap 20A is connected at an angle to strap 74 at seam 77M at one end and to the female end of a two-part releasable buckle 34B at the other end with a holding seam 77. Strap 20B passes through the connecting bar of the male end of the two-part releasable buckle 32B with both ends of strap 20B forming a connection at an angle with body loop strap 26 and is fastened by seam 79. Rear leash ring 22B is also held in place by the connection at the intersection of strap 20B, strap 26, and seam 79. In one or more of the preceding examples, the buckle may be reversed so as to replace the male end with a female end and the female end with a male end. Still other orientations of the buckle may be provided.

Figure 11:
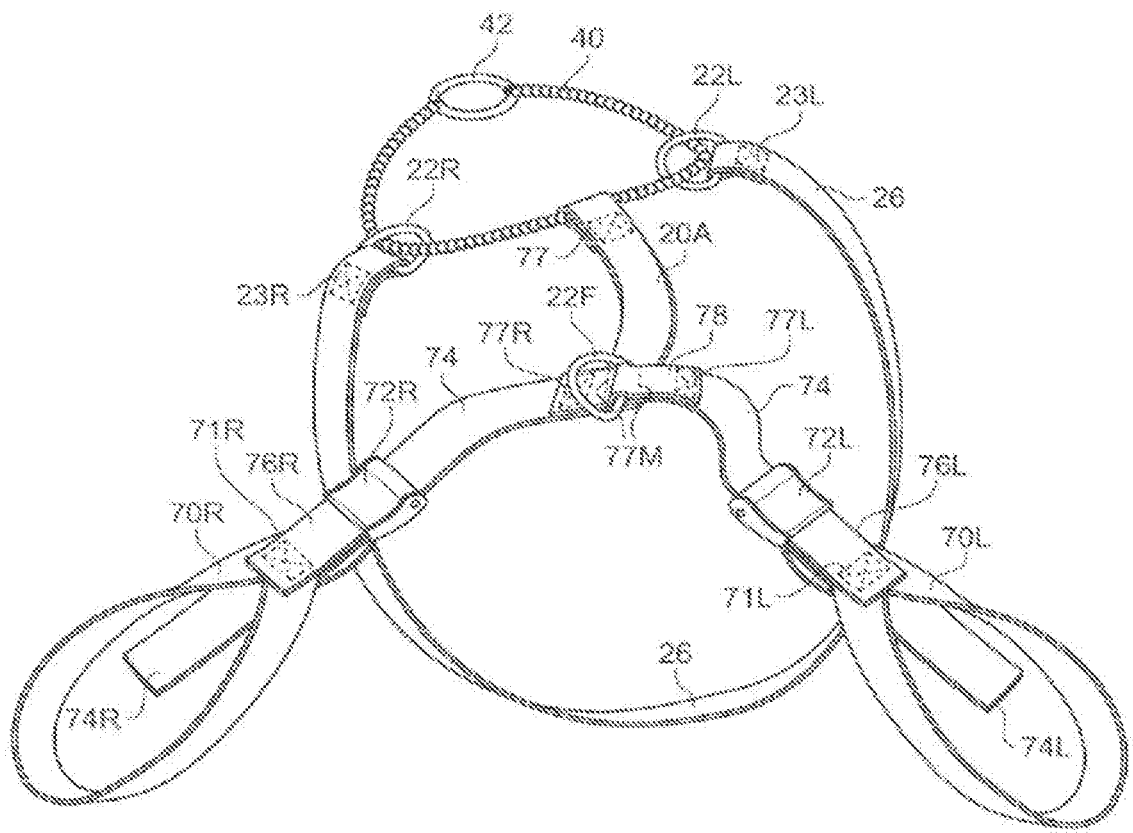
FIG. 11 shows a perspective view of another example of a no choke, control harness with the rear body loop having a cinchable feature.

FIG. 11 shows another example of the harness. The rearward connection of strap 20A now connects to a cinching loop 40 by means of strap 20A forming a loop with a seam 77. Loop 40 features a leash connecting ring 42. Both ends of body loop 26 are terminated with strap end loops which interlink with cinching loop 40. The right-side orientated end of loop strap 26 connects to rigid connector ring 22R with the loop secured by seam 23R. The left side orientated end of loop strap 26 connects to a rigid connector ring 22L with the loop secured by seam 23L. This example allows for an added control feature for a pulling quadruped. When a leash is connected to ring 42 and a quadruped pulls away, the loop ends 22R and 22L will be drawn together causing body loop 26 to constrict thereby prompting the pulling quadruped to respond by not pulling or jumping.

Figure 12:
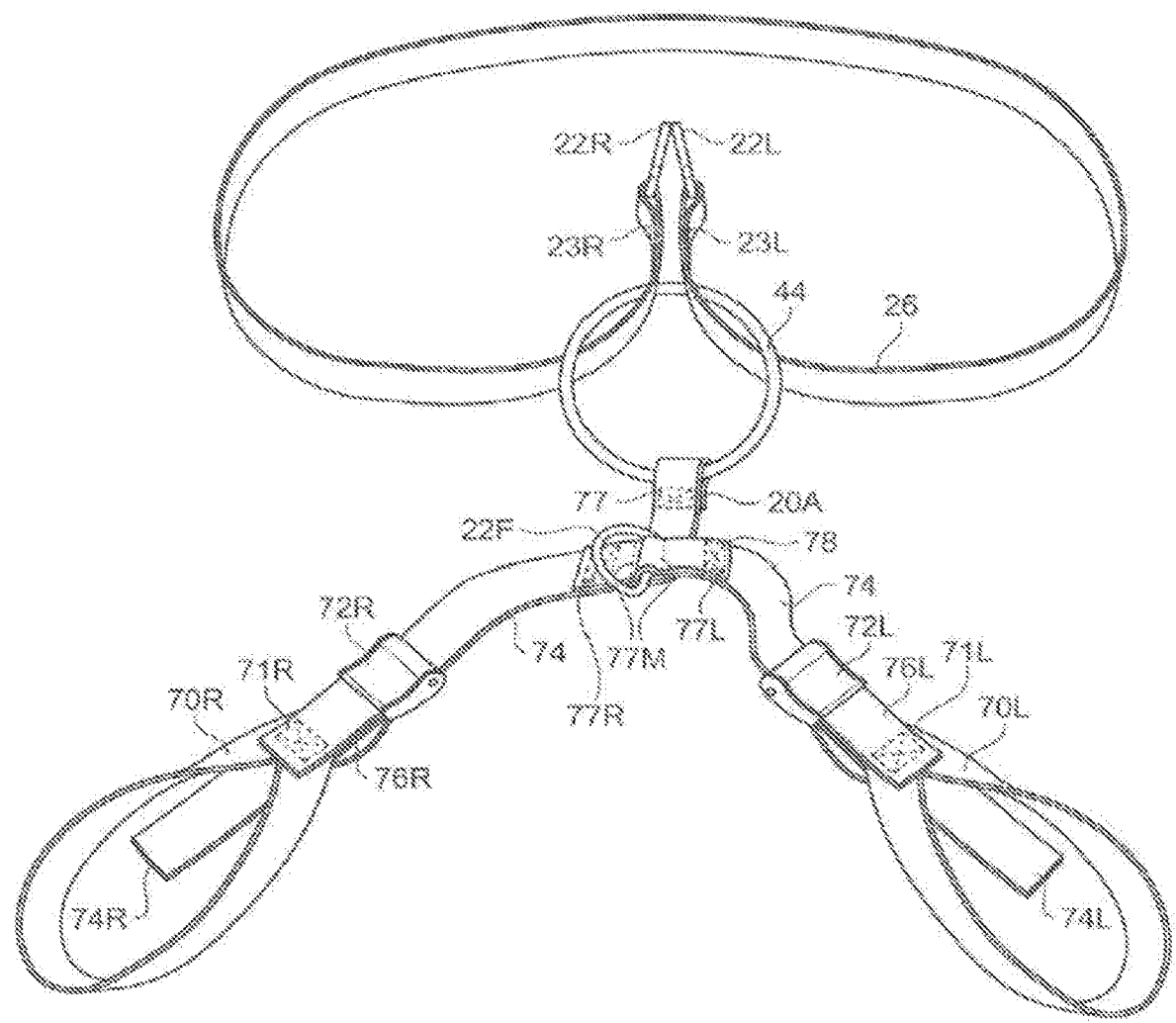
FIG. 12 shows a perspective view of another example of a no choke, control harness with the rear body loop having two ringed endpoint loops passing through a ring and meeting to become a leash connection point and also allowing for removal of the body loop for the front leg loop portion of the harness to be worn separately.

FIG. 12 shows an additional example of the harness. This example uses body loop 26 combined with the strap loop ends and seams 22R, 22L, 23R and 23L. A larger rigid loop 44 has been introduced to the loop end of strap 20A. Body loop 26 encircles the girth of a quadruped, the loop ends are brought up together through larger loop 44, and a leash connection point is made by combining loop ends 22R and 22L. When a leash is connected, and a harnessed quadruped pulls away or jumps, a cinching action occurs discouraging the quadruped's undesirable behavior.

Figure 13:
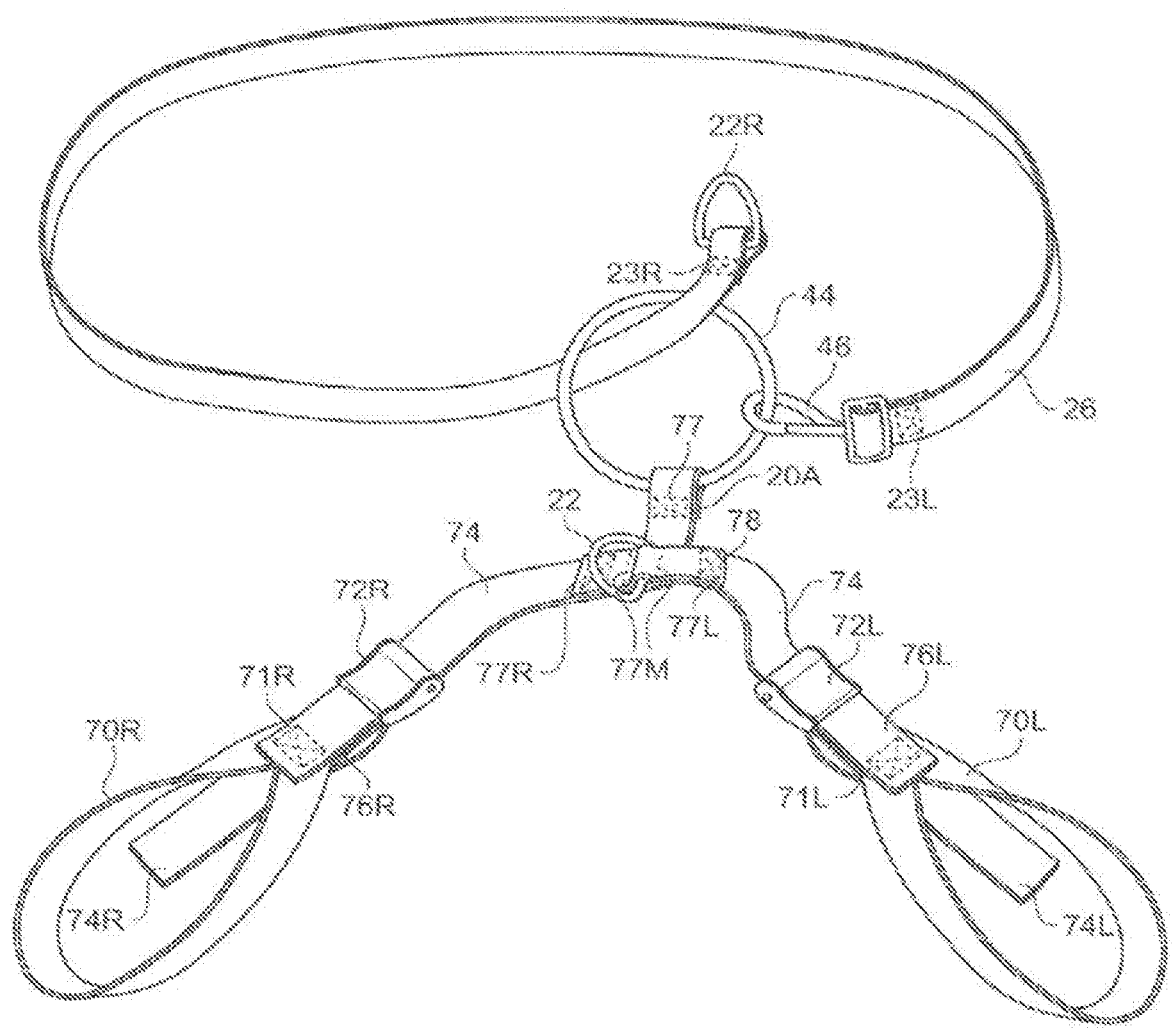
FIG. 13 shows a perspective view of an additional example of a no choke, control harness similar to FIG. 12, but with the rear body loop having a snap hook on one end, and a leash connection loop at the other end, which passes through the larger rear leash connection ring forming a cinchable body loop, making it apparent that the rear body loop is removable allowing for the front leg loop portion of the harness to be worn separately.

FIG. 13 presents an additional example of the harness showing body loop strap 26 with a snap hook 46 replacing strap loop end 22L shown in previous examples. Snap hook 46 is connected to larger loop 44 while still allowing strap loop end 22R to pass through loop 44 retaining cinching capability while reducing the leash connection to one loop end instead of two as shown in FIG. 12.

Figure 14:
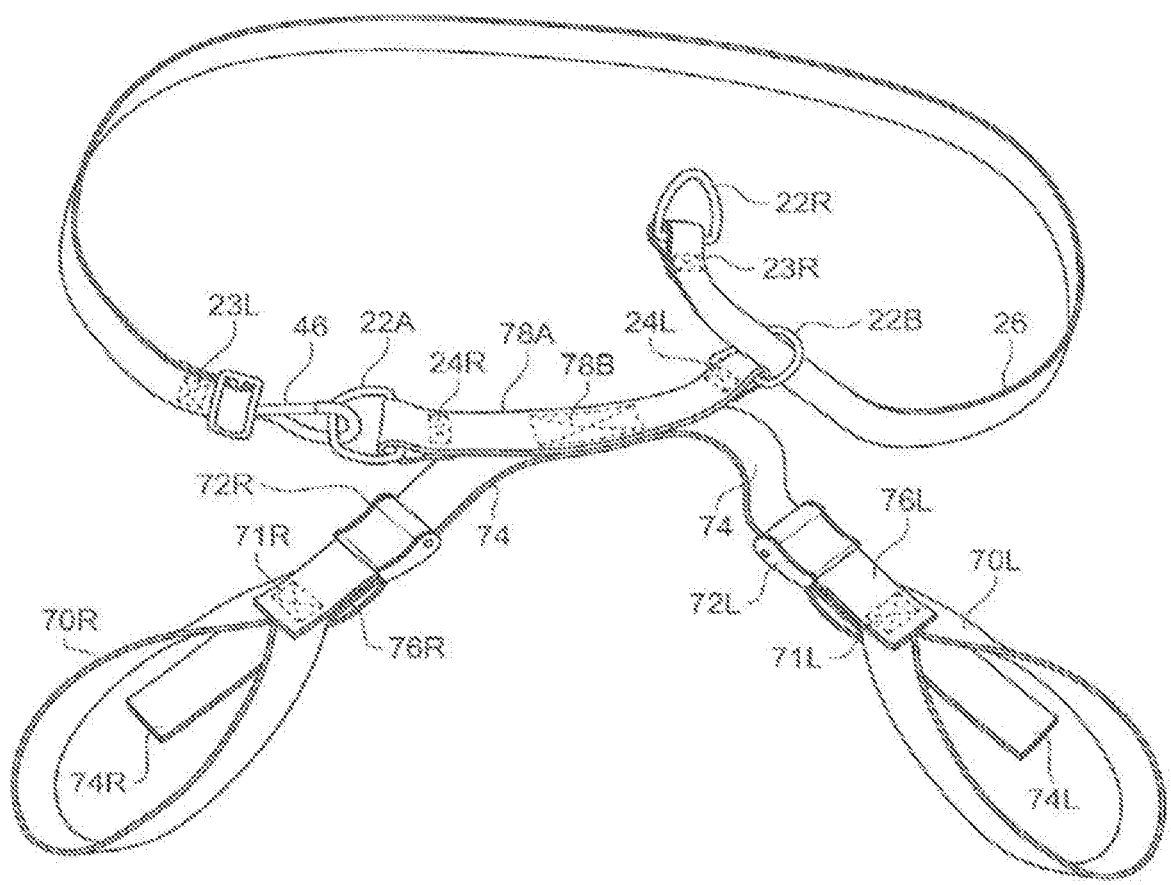
FIG. 14 shows a perspective view of another example of a no choke, control harness with the rear body loop connected directly to a portion of strap that overlays and is fastened to the strap that connects the left and right leg loops with said body loop forming a cinch and also allowing for the rear body loop to be disconnected so that the front leg loop portion of the harness can be worn separately.

FIG. 14 discloses an additional example. Here a length of strap 78A is placed centered on top of and in parallel orientation related to main harness strap 74, Connection is made between strap 74 and strap 78A at sewn seam 78B, The right-side end of strap 78A ends with a loop around rigid connector ring 22A held by seam 24R. The left side end of strap 78A ends with a loop around rigid connector ring 22B held by seam 24L. Body loop 26 is the same as in FIG. 13. This example allows for a more compact overall harness for quadrupeds with a short body length while still allowing for the same cinching action of the less compact examples.

Figure 15:
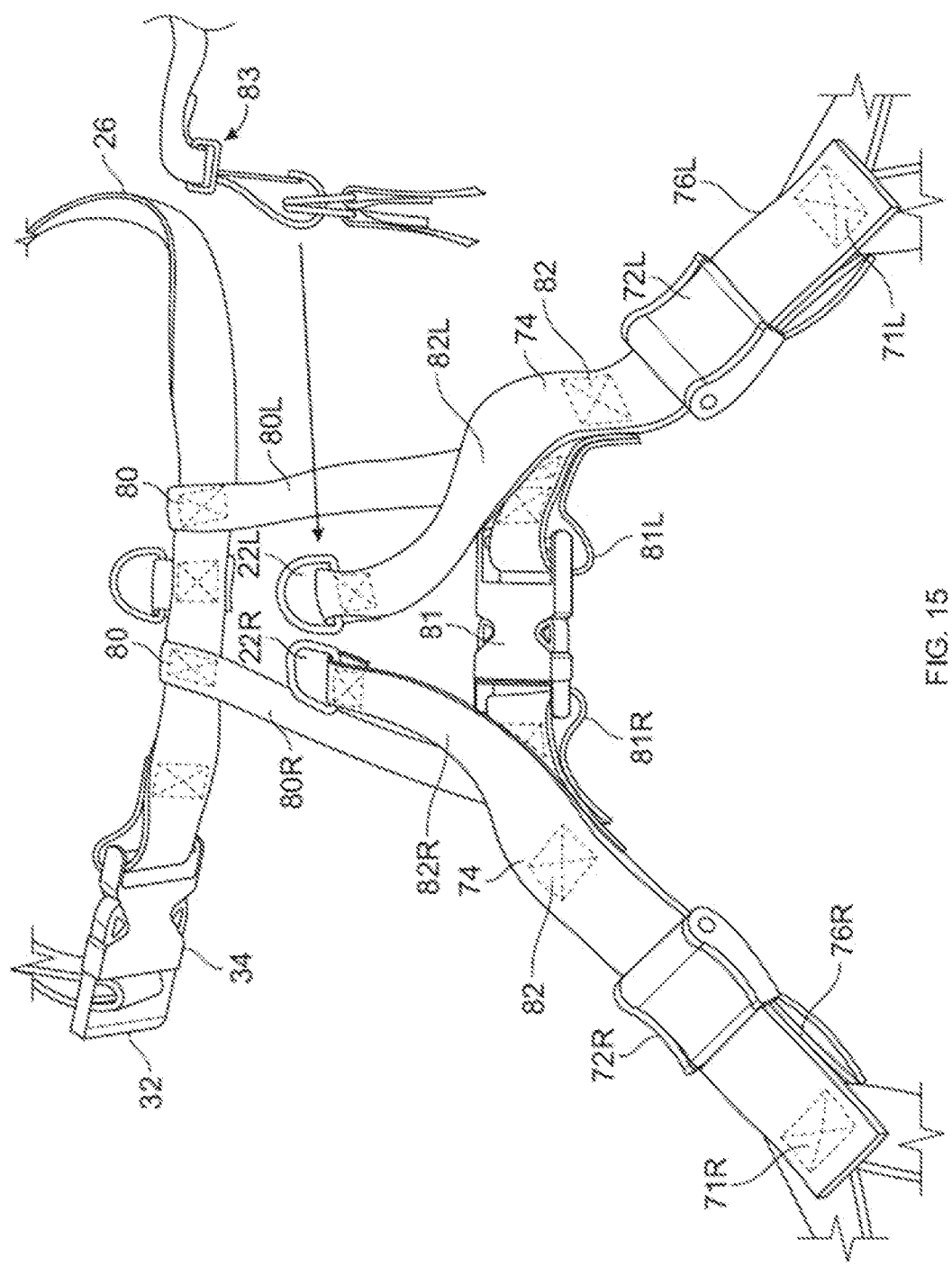
FIG. 15 shows a perspective view of another example of a no choke, control harness with a separable two-piece releasable buckle connecting a left leg loop and a right leg loop allowing for the loops to move apart for the application of the no choke, control harness to a quadruped and also shows a front leash loop for the left and right leg loops that, when used simultaneously, create an attachment point for a leash connection.

FIG. 15 discloses an additional example of a no choke, control harness. The example in FIG. 15 may be similar to previously described examples and where details are not shown or described, should be considered the same as one or more of the previously or later described examples. For example, the leg loops 70R and 70L are not described in detail here and can be assumed to the same or similar to the leg loops of FIGS. 1 and 2 or another example.

As shown a left mid piece strap 80L and a right mid piece strap 80R may be provided for connecting a body loop strap 26 to a main harness strap 74. That is, in contrast to the example shown in FIGS. 1 and 2, which include a single mid piece strap 20, multiple mid piece straps 80L and 80R may be provided. In addition, the main harness strap 74, securable to a right leg loop 70R and a left leg loop 70L, may be separated into a left portion and a right portion which may be releasably connected at or near a midpoint of the main harness strap by a separable buckle 81. A right portion of the strap 74 may include an additional right leash strap 82R and a left portion of the strap 74 may include an additional left leash strap 82L. The right leash strap 82R and the left leash strap 82L may extend inwardly toward one another and may include a right leash loop 22R and a left leash loop 22L, respectively, adapted for clipping simultaneously by a leash latch as shown. That is, the front right leash loop 22R and the front left leash loop 22L may forma D ring, O Ring, square buckle, or any combination thereof. The front right leash loop 22R and the front left leash loop 22L may align in parallel forming an attachment point 83 comprising at least two connection points to a common leash connector or snap hook connection, which may be secured simultaneously or separately.

The left mid piece strap 80L and the right mid piece strap 80R accommodates the separation of the right leg loop 70R and the left leg loop 70l by use of the separable two-piece releasable buckle 81. The mid piece straps 80L and 80R may be secured to the body loop strap 26 at a seam or sewn joint 80 and may secured to the main harness strap on either side of the buckle 81 at a seam or sewn joint. When the harness is in use, the fastened two-piece releasable buckle 81 may fix the right leg loop 70R and the left leg loop 70L relative to one another to accommodate a quadruped's walking motion. When unfastened, the two-piece releasable buckle 81 allows the right leg loop 70R and the left leg loop 70L to move further apart relative to one another. This additional degree of motion more easily allows placement of the harness onto a quadruped of various size and shape. After proper placement, a user may then fasten the two-piece releasable buckle 81 for use on a quadruped. The two-piece releasable buckle 81 may connect to the main harness strap 74 by a left seam 81L and a right seam 81R. The left seam 81L and the right seam 81R may connect by a textile sewing method, adhesive, fastener, or any combination thereof.

The right leash strap 82R connects a right portion of the main harness strap 74 by a seam 82. The seam 82 may connect by a textile sewing method, adhesive, fastener, or any combination thereof. The left leash strap 82L connects to a left portion of the main harness strap 74 by a seam 82. The seam 82 may connect by a textile sewing method, adhesive, fastener, or any combination thereof.

Figure 16:
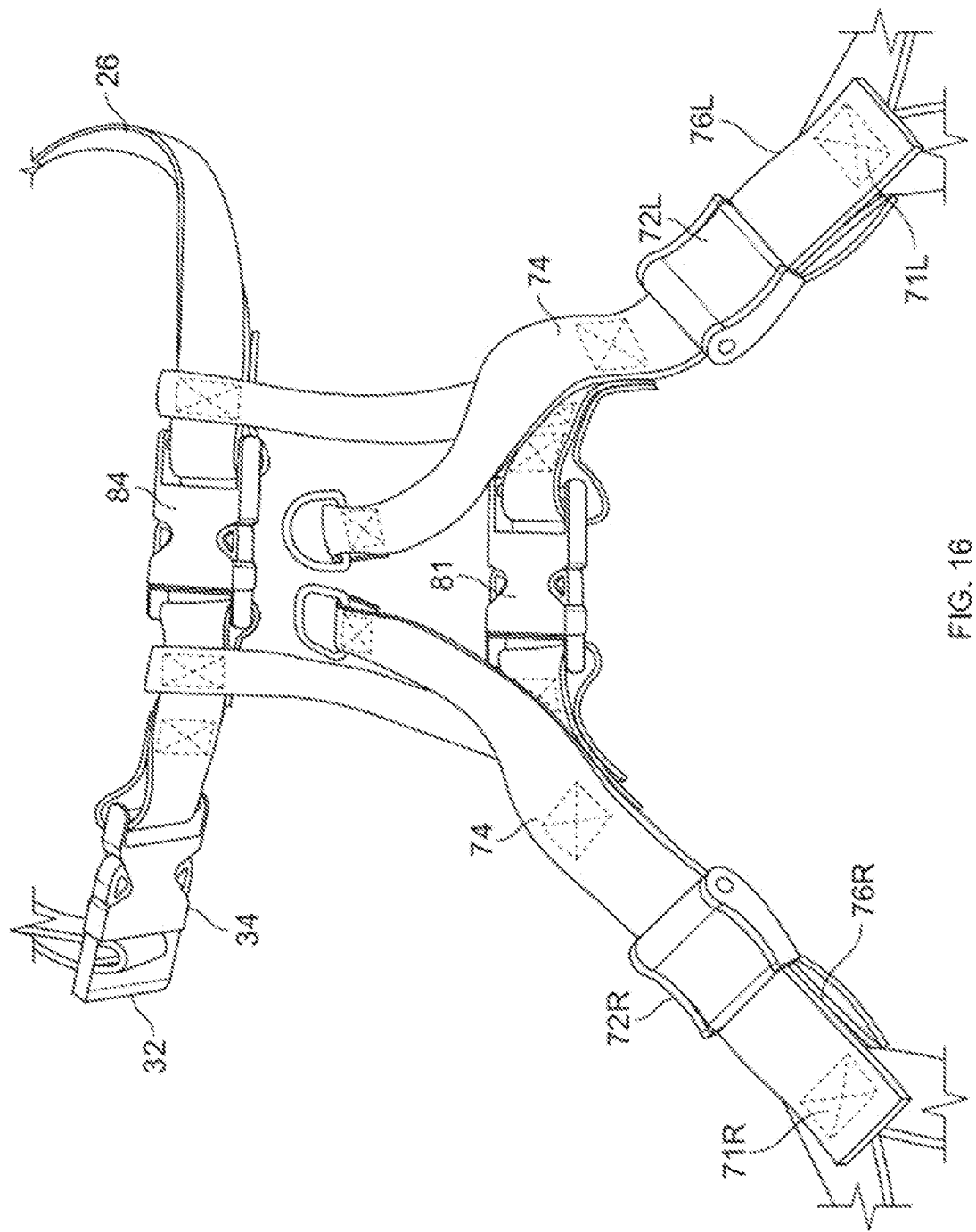
FIG. 16 shows a perspective view of another example of the no choke, control harness with the rear body loop separable by a two-piece releasable buckle and between the multiple connection points of the rear body loop and the left and right leg loops.

FIG. 16 discloses yet another example of a no choke, control harness according to one or more examples. Like the example of FIG. 15, this example may be similar to previously described examples and where details are not shown or described, they should be considered the same or similar to one or more of the previously or later described examples. With reference to FIG. 16, as shown, the harness of FIG. 16 is most similar to that of FIG. 15. However, in this example, the body loop strap 26 includes a two-piece separable buckle 84 similar to the separable buckle 81 of the main harness strap. The separable buckle 84 may be arranged near the midpoint of the body loop strap 26 and may take the place of a leash attachment shown in other examples. In one or more examples a buckle with a leash attachment may be provided. This particular example may provide for both the main harness strap 74 and the body loop strap 26 to be opened to accommodate larger quadrupeds and/or quadrupeds with limited mobility. While many references have been made to "sewn" and "sewing" throughout, other means of fastening can be substituted for sewing or an element or elements being sewn. Further, a seam is not limited to a seam formed by sewing or any specific means of fastening, but may refer to any point created by any means of fastening.

From the description above several advantages of some examples of the harness are possible:

1) Compression or choking of the sternum, windpipe, throat, trachea, esophagus, neck, front of chest or between the front legs may be reduced or eliminated since there are no components of the harness that cross over or touch these areas,
2) The harness may be easy to put on the quadruped and may be released and removed easily with one hand in two quick steps.
3) There is a control component to the harness causing the quadruped wearing it to experience physical balance redirection prompts when pulling away from the direction of the person leading with a leash.

4) The control component may help control a quadruped. If the quadruped pulls away in a forward direction directly away from the person leading the quadruped, the leg loops may engage both front leg pits and upper front legs equally and simultaneously and pull upward and back on the front legs to prompt the quadruped to stop pulling away to rebalance. If the quadruped pulls away laterally, moving its body in a sideward motion, the leg loop on the side that the quadruped is pulling towards may pull upward on the quadruped's upper leg and leg pit as he pulls away prompting the quadruped to rebalance and refrain from pulling in the direction that caused the balance interruption.

5) If the quadruped is facing the person leading him and the quadruped pulls away in a backward direction in an away motion the midsection girth belt will engage pulling upward and giving a moderate lifting and tightening sensation prompting the quadruped to refrain from pulling backwards and away because of the balance interruption.

6) The harness can also be placed over the top of a sweater or jacket and serves the purpose of further securing the jacket or sweater to the quadruped.

7) The use of the harness does not prevent the use of a training collar or a decorative collar that is not used for leading since there is no part of the harness that goes around the neck area.

8) The harness can also be used as an attachment framework for weather protection accessories, cargo carrying backpack gear, flotation devices, predator protection gear or any other types of designs that could benefit from the secure non-choking design of the harness invention.

While only selected examples have been chosen to illustrate the present invention, it will be apparent to those skilled in the art from this disclosure that various changes and modifications can be made herein without departing from the scope of the invention as defined in the appended claims. For example, the size, shape, location, or orientation of the various components can be changed as needed and/or desired. Components that are shown directly connected or contacting each other can have intermediate structures disposed between them. The functions of one element can be performed by two, and vice versa. The structures and functions of one example can be adopted in another example. It is not necessary for all advantages to be present in a particular example at the same time. Every feature which is unique from the prior art, alone or in combination with other features, also should be considered a separate description of further inventions by the applicant, including the structural and/or functional concepts embodied by such feature(s). Thus, the foregoing descriptions of the examples according to the present invention are provided for illustration only, and not for the purpose of limiting the invention as defined by the appended claims and their equivalents

What is claimed is:

1. A no choke, control harness, comprising:
   a main harness strap comprising a first end, a second end opposite the first end, and a midpoint, the main harness strap defining a lateral orientation and configured for draping across the withers of a quadruped;
   a first leg loop extending from the first end of the main harness strap in a first lateral direction and configured for positioning around a first foreleg of the quadruped, wherein the first leg loop is formed from a strap having a first end and a second end opposite the first end sharing a top surface and a bottom surface wherein the top surface of the first end is connected to the bottom surface of the second end; and
   a second leg loop extending from the second end of the main harness strap in a second lateral direction opposite the first lateral direction and configured for positioning around a second foreleg of the quadruped, wherein the second leg loop is formed from a strap having a first end and a second end opposite the first end sharing a top surface and a bottom surface wherein the top surface of the first end is connected to the bottom surface of the second end; and
   a leash attachment coupled to the control harness.

2. The no choke, control harness of claim 1, wherein the first leg loop is releasably linked to the main harness strap with a buckle.

3. The no choke, control harness of claim 1, further comprising a mid piece strap with a first end and a second end and the first end of the mid piece strap is connected to the main harness strap between the first end and the second end of the main harness strap.

4. The no choke, control harness of claim 3 further comprising a body loop strap connected to the second end of the mid piece strap and the body loop strap is configured to encircle the girth of the quadruped's body in the ribcage area.

5. The no choke, control harness of claim 4, wherein the body loop strap comprises a releasable buckle configured to allow fitment adjustment.

6. The no choke, control harness of claim 4, wherein the mid piece strap comprises two individual straps that are coupled by a releasable buckle.

7. The no choke, control harness of claim 4, wherein the mid piece strap, comprises two mid piece straps.

8. The no choke, control harness of claim 7, wherein the body loop strap comprises a releasable buckle near a midpoint thereof.

9. The no choke, control harness of claim 3, further comprising:
   a cinching loop; and
   a body loop strap,
   wherein:
      the second end of the mid piece strap is connected to a cinching loop;
      the cinching loop passes through rigid connector rings at each of a first end and a second end of the body loop strap; and
      the cinching loop comprises a leash connecting ring.

10. The no choke, control harness of claim 3, further comprising:
    a rigid loop connected to the second end of the mid piece strap; and
    a body loop strap with a first end and a second end,
    wherein:
       each of the first end and the second end of the body loop strap is connected to a loop end; and
       the loop ends are configured to receive a leash such that a quadruped wearing the no choke, control harness and straining against the leash will feel a cinching action of the body loop strap.

11. The no choke, control harness of claim 3, further comprising:
    a rigid loop connected to the second end of the mid piece strap; and
    a body loop strap with a first end and a second end,
    wherein:

the first end of the body loop strap is connected to a snap hook and the snap hook is connected to the rigid loop; and the second end of the body loop strap is connected to a loop end configured to receive a leash such that a quadruped wearing the no choke, control harness and straining against the leash will feel a cinching action of the body loop strap.

12. The no choke, control harness of claim 1, wherein the main harness strap comprises a releasable buckle arranged at or near the midpoint and establishing a right portion and a left portion of the main harness strap.

13. The no choke, control harness of claim 12, wherein the right portion comprises a right leash strap and the left portion comprises a left leash strap.

14. The no choke, control harness of claim 13, where the right leash strap and the left leash strap each include, respectively, right and left leash attachment loops.

15. A no choke, control harness, comprising:
a main harness strap comprising a first end, a second end opposite the first end, and a midpoint, the main harness strap defining a lateral orientation and configured for draping across the withers of a quadruped;
a first leg loop extending from the first end of the main harness strap in a first lateral direction and configured for positioning around a first foreleg of the quadruped;
a second leg loop extending from the second end of the main harness strap in a second lateral direction opposite the first lateral direction and configured for positioning around a second foreleg of the quadruped;
a leash attachment coupled to the control harness; and
a body loop strap configured to encircle the girth of the quadruped's body in the ribcage area.

16. The no choke, control harness of claim 15, further comprising an additional strap connected to the midpoint of the main harness strap and oriented substantially parallel to the main harness strap.

17. The no choke, control harness of claim 16, wherein:
the additional strap has a first end and a second end and a loop end at each of the first end and second end;
the body loop strap has a first end and a second end;
a snap hook is connected to the first end of the body loop strap;
a loop end is connected to the second end of the body loop strap; and
the snap hook is configured for releasable connection to the loop end at the first end of the additional strap.

18. The no choke, control harness of claim 15, wherein the main harness strap comprises a releasable buckle arranged at or near the midpoint and establishing a right portion and a left portion of the main harness strap.

19. A method of placing a no choke, control harness on a quadruped, the no choke, control harness comprising:
a main harness strap comprising a first end and a second end;
a first leg loop extending from the first end of the main harness strap; and
a second leg loop extending from the second end of the main harness strap, the method comprising:
draping the main harness strap across the withers of the quadruped;
placing the first leg loop around the first foreleg of the quadruped;
placing the second leg loop around the second foreleg of the quadruped; and
avoiding placement of any restraining component across the chest or neck area of the quadruped.

20. The method of claim 19, further comprising coupling a first portion of a releasable buckle on a free end of arranged on the main harness strap to a second portion of the releasable buckle on a body loop strap.

* * * * *